(12) United States Patent
Macaskill et al.

(10) Patent No.: US 8,996,462 B2
(45) Date of Patent: Mar. 31, 2015

(54) SYSTEM AND METHOD FOR MANAGING DUPLICATE FILE UPLOADS

(75) Inventors: Don Macaskill, Los Altos, CA (US); Samuel Nichols, Mountain View, CA (US)

(73) Assignee: Smugmug, Inc., Mountain View, CA (US)

( * ) Notice: Subject to any disclaimer, the term of this patent is extended or adjusted under 35 U.S.C. 154(b) by 9 days.

(21) Appl. No.: 13/183,145

(22) Filed: Jul. 14, 2011

(65) Prior Publication Data

US 2013/0018845 A1 Jan. 17, 2013

(51) Int. Cl.
*G06F 17/30* (2006.01)
*H04L 29/08* (2006.01)

(52) U.S. Cl.
CPC .......... *H04L 67/02* (2013.01); *G06F 17/30265* (2013.01); *H04L 67/306* (2013.01)
USPC ........................................................ 707/634

(58) Field of Classification Search
None
See application file for complete search history.

(56) References Cited

U.S. PATENT DOCUMENTS

| | | | | |
|---|---|---|---|---|
| 5,781,909 A * | 7/1998 | Logan et al. ........................ | 1/1 |
| 6,243,501 B1 * | 6/2001 | Jamali ........................ | 382/305 |
| 6,269,394 B1 * | 7/2001 | Kenner et al. ................. | 709/217 |
| 7,751,807 B2 * | 7/2010 | Lin et al. ....................... | 455/418 |
| 7,904,462 B1 * | 3/2011 | Thirumalai et al. .......... | 707/749 |
| 8,280,861 B1 * | 10/2012 | Park et al. ..................... | 707/692 |
| 2002/0174103 A1 * | 11/2002 | Hsiao et al. ....................... | 707/1 |
| 2010/0332460 A1 * | 12/2010 | Forstall et al. ................ | 707/687 |
| 2011/0085728 A1 * | 4/2011 | Gao et al. ...................... | 382/165 |
| 2011/0085734 A1 * | 4/2011 | Berg et al. ..................... | 382/195 |
| 2011/0218973 A1 * | 9/2011 | Pendlebury et al. .......... | 707/692 |
| 2012/0173489 A1 * | 7/2012 | Hardee et al. ................. | 707/640 |

OTHER PUBLICATIONS

"The Photoshop Elements 8 Book for Digital Photographers", by Scott Kelby and M1att Kloskowski, Publisher: Peachpit Press, Publication Date: Oct. 29, 2009, ISBN: 0-321-66033-1, pp. 1-52 and 379-437.*
Joshua Hoffman, "Utility Spotlight: RichCopy", TechNet Magazine, Apr. 2009; http://technet.microsoft.com/en-us/magazine/2009.04.utilityspotlight.aspx.*
Copywhiz website, archived at archive.org on Jun. 2010.*
Copywhiz complete website, archived at archive.org on Jun. 8, 2010.*
FileBoss webpages archied on archive.org, Apr. 2010.*
naspinski, "saving multiple files of he same name (c#)", forum post, Sep. 23, 2008, website http://naspinski.net/post/Saving-multiple-files-of-the-same-name.aspx.*

* cited by examiner

*Primary Examiner* — Jay Morrison
(74) *Attorney, Agent, or Firm* — Patterson & Sheridan, LLP (57) ABSTRACT

A method for managing uploads of duplicate files. The method includes receiving a request from a user or an uploader client to upload a first file to an online album, and determining whether the first file is a duplicate of a second file included in the online album based on one or more attributes shared between the first file and the second file. Based on upload preferences associated with the user, the first file is caused to be not uploaded to the online album, the first file is caused to be uploaded as a new file to the online album, or the first file is caused to be uploaded as a replacement for the second file.

16 Claims, 8 Drawing Sheets

SYSTEM AND METHOD FOR MANAGING DUPLICATE FILE UPLOADS

BACKGROUND

1. Field of the Invention

The present invention relates to the field of computer software and, in particular, to a system and method for managing duplicate file uploads.

2. Description of the Related Art

Photography is a popular activity for both professionals and amateurs alike. Digital photography, especially, is an activity that has undergone widespread growth in recent years based on the proliferation of digital camera technology. As the art of digital photography becomes more widely adopted, the process of transferring digital media files to digital photography websites is increasing.

One example of a digital photography website is Smug-Mug.com, which allows users to, among other things, manage an online storefront for their digital media file collection. Consider the example of a wedding photographer who is interested in selling his or her digital media files, such as digital images and digital videos taken at a wedding. To begin this process, the wedding photographer accesses his or her account and creates a new online album titled, e.g., "Clark and Mary's Wedding." The wedding photographer then selects one or more digital media files to upload to the online album. The upload process is accomplished using an uploader client, such as an HTML-5 uploader that enables the wedding photographer to select one or more digital media files locally available on his or her desktop computer to be uploaded to the album. The upload process begins, and the selected one or more digital media files are uploaded to the online album. Once uploaded, the one or more digital media files can be stored on a server operated by a third party with whom the digital photography website has a storage contract arrangement. The wedding photographer may then distribute and/or sell the uploaded digital media files through the digital photography website.

Oftentimes, individuals viewing the digital media files in the online album, such as attendees of the wedding, may choose to purchase a copy of a digital media file, and request changes to be made thereto, such as color correction, red eye correction, and the like. The wedding photographer is notified of such requests, and typically requests a short amount of time to adjust the digital media files on his or her desktop computer, often referred to as a "proof-delay." When the editing process is complete, the adjusted digital media files are re-uploaded to the online album so that they can be made available to the purchasers.

Unfortunately, re-uploading the digital media files often presents filename conflicts, especially when the wedding photographer does not rename the adjusted digital media files. For example, for a file with a filename "Photo_23.JPG" that has been adjusted by the wedding photographer, there likely exists an original digital media file in the online album with the same filename. Filename conflicts often require users to rename each of the conflicting digital media files. As a result, the online album becomes disorganized and fragmented. Moreover, the user may choose to ignore the conflict and upload duplicate data, which results in unnecessary consumption of computing resources.

As the foregoing illustrates, there is a need in the art for an improved technique for managing the uploading of files.

SUMMARY

One embodiment of the invention provides a method for managing uploads of duplicate files. The method includes receiving a request from a user to upload a first file to an online album, determining whether the first file is a duplicate of a second file included in the online album based on one or more attributes shared between the first file and the second file and, based on upload preferences associated with the user, causing the first file to be not uploaded to the online album, causing the first file to be uploaded as a new file to the online album, or causing the first file to be uploaded as a replacement for the second file.

Another embodiment of the invention provides a method for managing file uploads. The method includes receiving a request from an uploader client to upload a first file to an online album, determining whether the first file is a duplicate of a second file included in the online album and, based on upload preferences associated with the user, causing the first file to be not uploaded to the online album, causing the first file to be the uploaded as a new file to the online album, or causing the first file to be uploaded as a replacement for the second file.

Further embodiments of the present invention provide a non-transitory computer-readable storage medium that includes instructions for causing a computer system to carry out one or more of the methods set forth above.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, several specific details are presented to provide a thorough understanding of embodiments of the invention. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
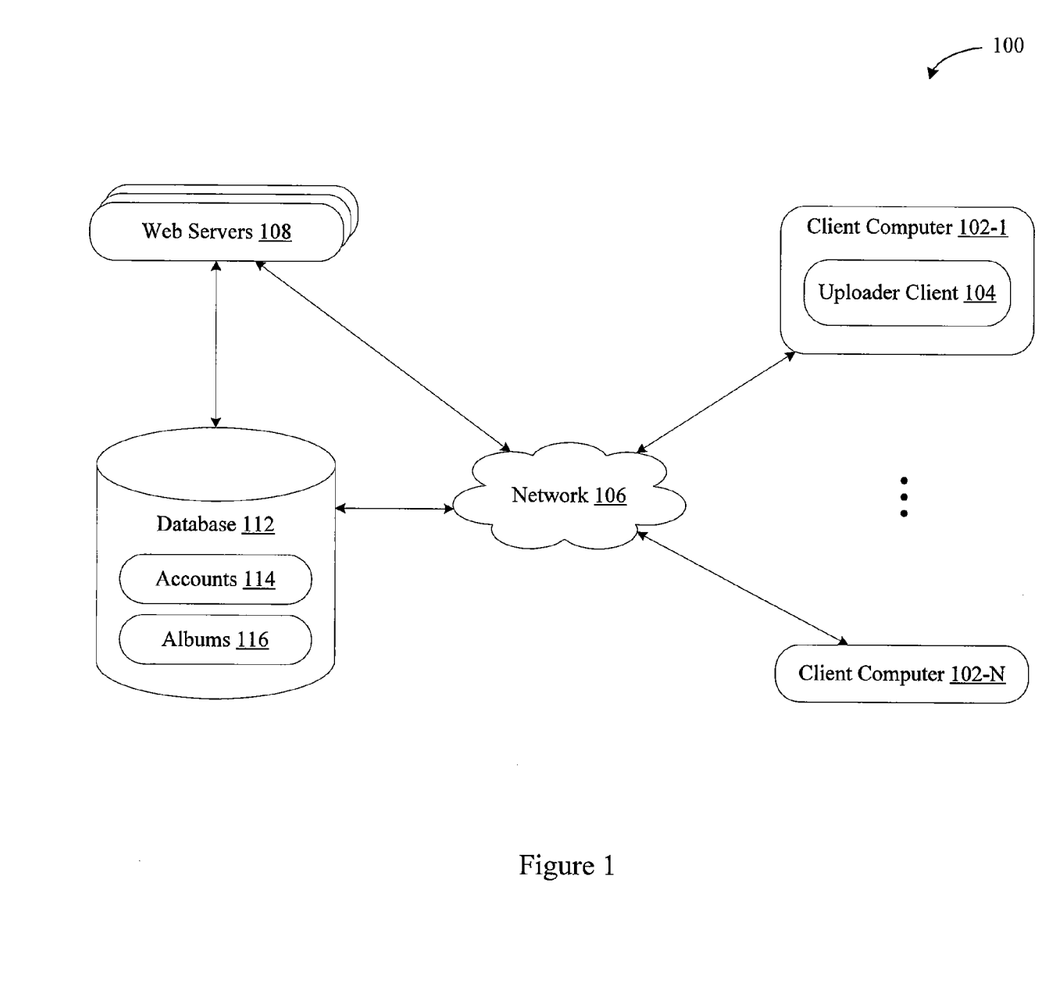
FIG. 1 illustrates a networked computer environment in which embodiments of the invention may be practiced.

FIG. 1 illustrates a networked computer environment 100 in which embodiments of the invention may be practiced. As shown, the networked computer environment 100 includes a plurality of client computers 102 (only two of which are shown) and a plurality of web servers 108 that are in communication with database 112, which stores accounts 114 and online albums 116. In one embodiment, the database 112 is managed by a separate entity (e.g., a cloud storage provider) than the web server 108. In this embodiment, the data included in the albums 116 can be transferred from the client computer 102 to the database 112 via the network 106, bypassing the web servers 108. An account 114 is a data object that stores data associated with a user, such as the user's email address, password, contact information, billing information, upload preferences, and the like. An online album 116 is a data object for managing an online album, including a name of the online album, a list of digital media files included in the online album (and stored in database 112), and the like. The client computers 102 and the web server computers 108 are connected over a computer network 106, e.g., the Internet.

Figure 2:
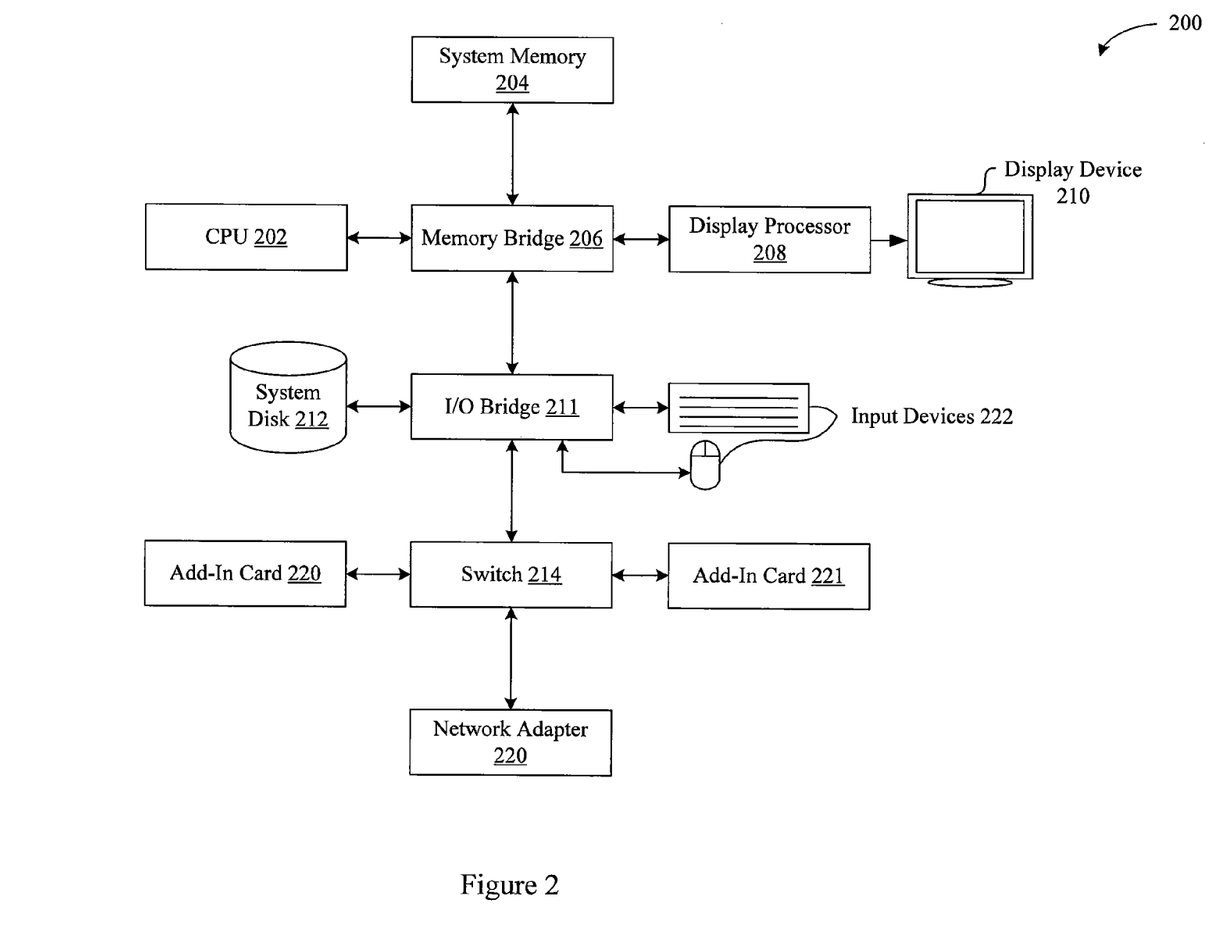
FIG. 2 depicts one architecture of a computer system within which embodiments of the present invention may be implemented.

Each client computer 102 includes conventional components of a computing device, e.g., a processor, system memory, a hard disk drive, input devices such as a mouse and a keyboard, and output devices such as a monitor, as illustrated in FIG. 2. Each web server 108 includes a processor and a system memory (not shown). Web servers 108 are programmed to communicate with one another and are also programmed to communicate with client computers 102 using the TCP/IP protocol. The client computers 102 are programmed to execute web browser programs and other software applications, such as uploader client 104, and access the web pages and/or applications managed by web servers 108 by specifying in a browser application a uniform resource locator (URL) that directs to web servers 108.

In the embodiments of the present invention described below, users are respectively operating the client computers 102 that are connected to the web servers 108 over the network 106. The web pages that are displayed to a user are transmitted from the web servers 108 to the user's client computer 102 and processed by the web browser program stored in that user's client computer 102 for display through a display device in communication with that user's client computer 102.

FIG. 2 depicts one architecture of a computer system 200 within which embodiments of the present invention may be implemented. Specifically, computer system 200 is representative of a configuration that may be implemented by web servers 108 and/or client computers 102. Computer system 200 may be a computer workstation, personal computer, video game console, personal digital assistant, rendering engine, or any other device suitable for practicing one or more embodiments of the present invention.

As shown, computer system 200 includes a central processing unit (CPU) 202 and a system memory 204 communicating via a bus path that may include a memory bridge 206. CPU 202 includes one or more processing cores, and, in operation, CPU 202 is the master processor of system 200, controlling and coordinating operations of other system components. System memory 204 stores software applications and data for use by CPU 202. CPU 202 runs software applications and optionally an operating system. Memory bridge 206, which may be, e.g., a Northbridge chip, is connected via a bus or other communication path (e.g., a HyperTransport link) to an I/O (input/output) bridge 211. I/O bridge 211, which may be, e.g., a Southbridge chip, receives user input from one or more user input devices 222 (e.g., keyboard, mouse, joystick, digitizer tablets, touch pads, touch screens, still or video cameras, motion sensors, and/or microphones) and forwards the input to CPU 202 via memory bridge 206.

A display processor 208 is coupled to memory bridge 206 via a bus or other communication path (e.g., a PCI Express, Accelerated Graphics Port, or HyperTransport link); in one embodiment display processor 208 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 204.

Display processor 208 periodically delivers pixels to a display device 210 (e.g., a screen or conventional CRT, plasma, OLED, SED or LCD based monitor or television). Additionally, display processor 208 may output pixels to film recorders adapted to reproduce computer generated images on photographic film. Display processor 208 can provide display device 210 with an analog or digital signal.

A system disk 212 is also connected to I/O bridge 211 and may be configured to store content and applications and data for use by CPU 202 and display processor 208. System disk 212 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 214 provides connections between I/O bridge 211 and other components such as a network adapter 220 and various add-in cards 220 and 221. Network adapter 220 allows system 200 to communicate with other systems via an electronic communications network, and may include wired or wireless communication over local area networks and wide area networks such as the Internet.

Other components (not shown), including USB or other port connections, film recording devices, and the like, may also be connected to I/O bridge 211. For example, an audio processor may be used to generate analog or digital audio output from instructions and/or data provided by CPU 202, system memory 204, or system disk 212. Communication paths interconnecting the various components in FIG. 10 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 208 incorporates circuitry optimized for graphics and video processing, including, for example, video output circuitry, and constitutes a graphics processing unit (GPU). In another embodiment, display processor 208 incorporates circuitry optimized for general purpose processing. In yet another embodiment, display processor 208 may be integrated with one or more other system elements, such as the memory bridge 206, CPU 202, and I/O bridge 211 to form a system on chip (SoC). In still further embodiments, display processor 208 is omitted and software executed by CPU 202 performs the functions of display processor 208.

Pixel data can be provided to display processor 208 directly from CPU 202. In some embodiments of the present invention, instructions and/or data representing a scene are provided to a render farm or a set of server computers, each similar to system 200, via network adapter 220 or system disk 212. The render farm generates one or more rendered images of the scene using the provided instructions and/or data. These rendered images may be stored on computer-readable media in a digital format and optionally returned to system

200 for display. Similarly, stereo image pairs processed by display processor 208 may be output to other systems for display, stored in system disk 212, or stored on computer-readable media in a digital format.

Alternatively, CPU 202 provides display processor 208 with data and/or instructions defining the desired output images, from which display processor 208 generates the pixel data of one or more output images, including characterizing and/or adjusting the offset between stereo image pairs. The data and/or instructions defining the desired output images can be stored in system memory 204 or graphics memory within display processor 208. In an embodiment, display processor 208 includes 3D rendering capabilities for generating pixel data for output images from instructions and data defining the geometry, lighting shading, texturing, motion, and/or camera parameters for a scene. Display processor 208 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 204 is connected to CPU 202 directly rather than through a bridge, and other devices communicate with system memory 204 via memory bridge 206 and CPU 202. In other alternative topologies display processor 208 is connected to I/O bridge 211 or directly to CPU 202, rather than to memory bridge 206. In still other embodiments, I/O bridge 211 and memory bridge 206 might be integrated into a single chip. The particular components shown herein are optional; for instance, any number of add-in cards or peripheral devices might be supported. In some embodiments, switch 214 is eliminated, and network adapter 220 and add-in cards 220, 221 connect directly to I/O bridge 211.

Network computers are another type of computer system that can be used in conjunction with the teachings provided herein. Network computers do not usually include a hard disk or other mass storage, and the executable programs are loaded from a network connection into the memory 204 for execution by the CPU 202. A Web TV system, which is known in the art, is also considered to be a computer system, but it may lack some of the features shown in FIG. 2, such as certain input or output devices. A typical computer system will usually include at least a processor, memory, and a bus coupling the memory to the processor. In some embodiments, the system 200 may include one or more CPUs 202, one or more display processors 208, and/or one or more of any of the system elements included in FIG. 2.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description above. In addition, the present examples are not described with reference to any particular programming language, and various examples may thus be implemented using a variety of programming languages.

Figure 3A:
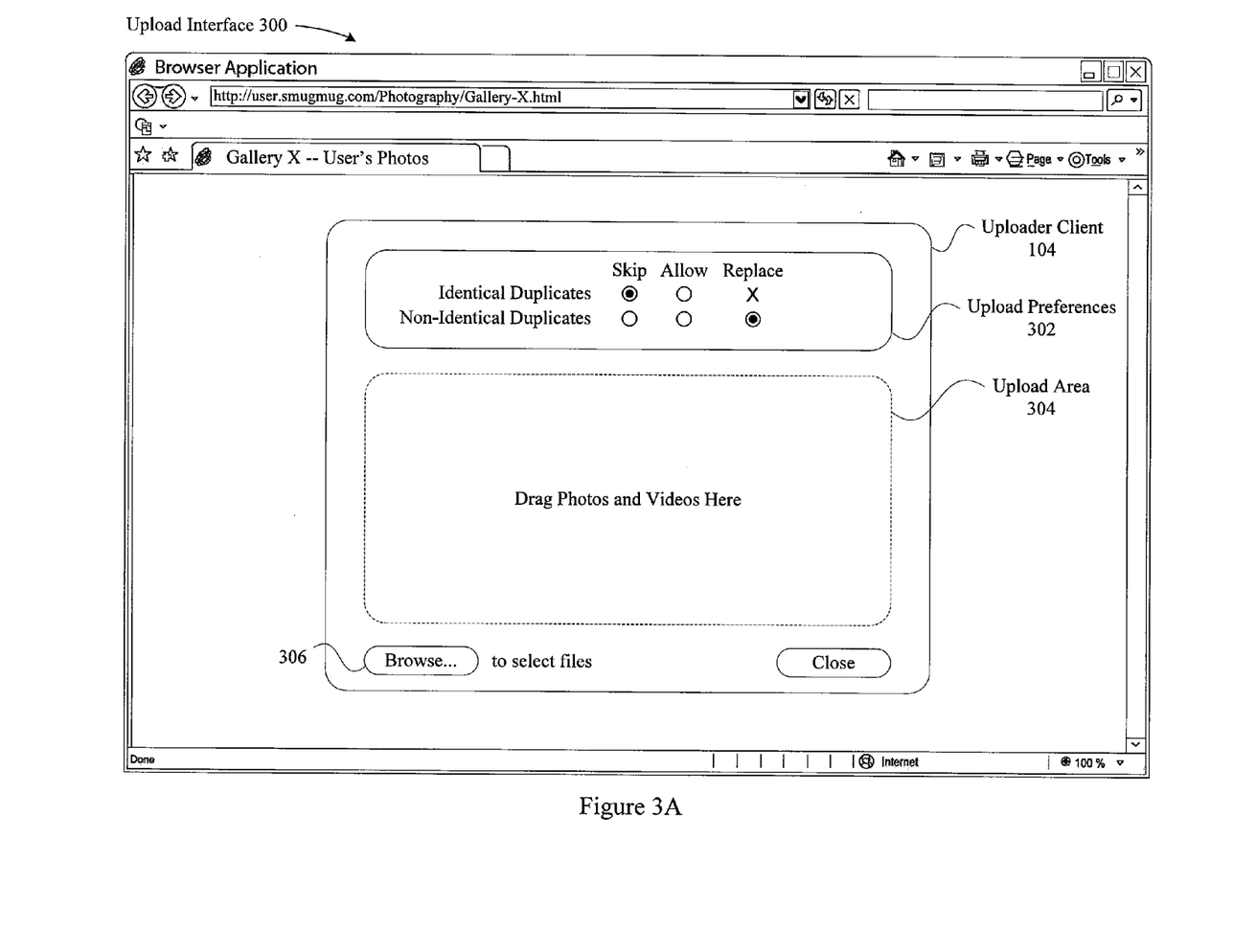
FIG. 3A is a screenshot of an upload interface configured to handle duplicate file uploads based on a user's upload preferences, according to one embodiment of the invention.

FIG. 3A is a screenshot of an upload interface 300 configured to handle duplicate file uploads based on a user's upload preferences, according to one embodiment of the invention. As shown, upload interface 300 is accessible via a web browser application and includes uploader client 104, where uploader client 104 comprises upload preferences portion 302 and upload area 304. Uploader client 104 may be developed using a variety of technologies, including Java®, Microsoft Silverlight®, Adobe Flash®, HTML-5, and the like. Uploader client 104 is accessible when a user is logged into his or her account 114 and chooses to upload files into a new or existing online album 116. When uploader client 104 is loaded into the web browser application, uploader client 104 communicates with web servers 108 to retrieve upload preferences included in the account 114 that is associated with the user. In this way, the input fields included in upload preferences portion 302 may be automatically populated by uploader client 104 such that the user is not required to re-input his or her preferences each time uploader client 104 is loaded.

As shown, uploader client 104 enables the user to select one or more digital media files for upload according to a variety of techniques. For example, a "browse" button 306, when selected by the user, loads a file browser (not shown) that enables the user to select one or more digital media files that are locally available to the device on which the web browser application is executing, e.g., digital media files stored on a local or external hard drive. Alternatively, upload area 304 enables the user to select one or more digital media files by "dragging and dropping" one or more digital media files within the boundaries of upload area 304. When the one or more digital media files are selected, uploader client 104 begins uploading the one or more digital media files to web servers 108 according to upload preferences 302, i.e., where "identical duplicates" and "non-identical duplicates" are skipped, allowed, or replaced, as described in further detail below in conjunction with FIG. 4 and FIG. 5.

An identical duplicate refers to a digital media file that shares both the same filename and the same content as another digital media file, e.g., a first digital media file named "DSC1023.jpg" and a second digital media file named "DSC1023.jpg", where the content of the first digital media file is a color image of a tropical bird, and where the content of the second digital media file is the exact same color image of the tropical bird. In this example, the first digital media file and the second digital media file are referred to as identical duplicates of one another.

Conversely, a non-identical duplicate refers to a digital media file that shares the same filename with another digital media file but does not share similar content with that digital media file, e.g., a first digital media file named "Image_001.jpg" and a second digital media file named "Image_001.jpg", where the content of the first digital media file is a color image of a tropical bird, and where the content of the second digital media file is the a black and white image of the same tropical bird. In this example, the first digital media file and the second digital media file are referred to as non-identical duplicates of one another.

Figure 3B:
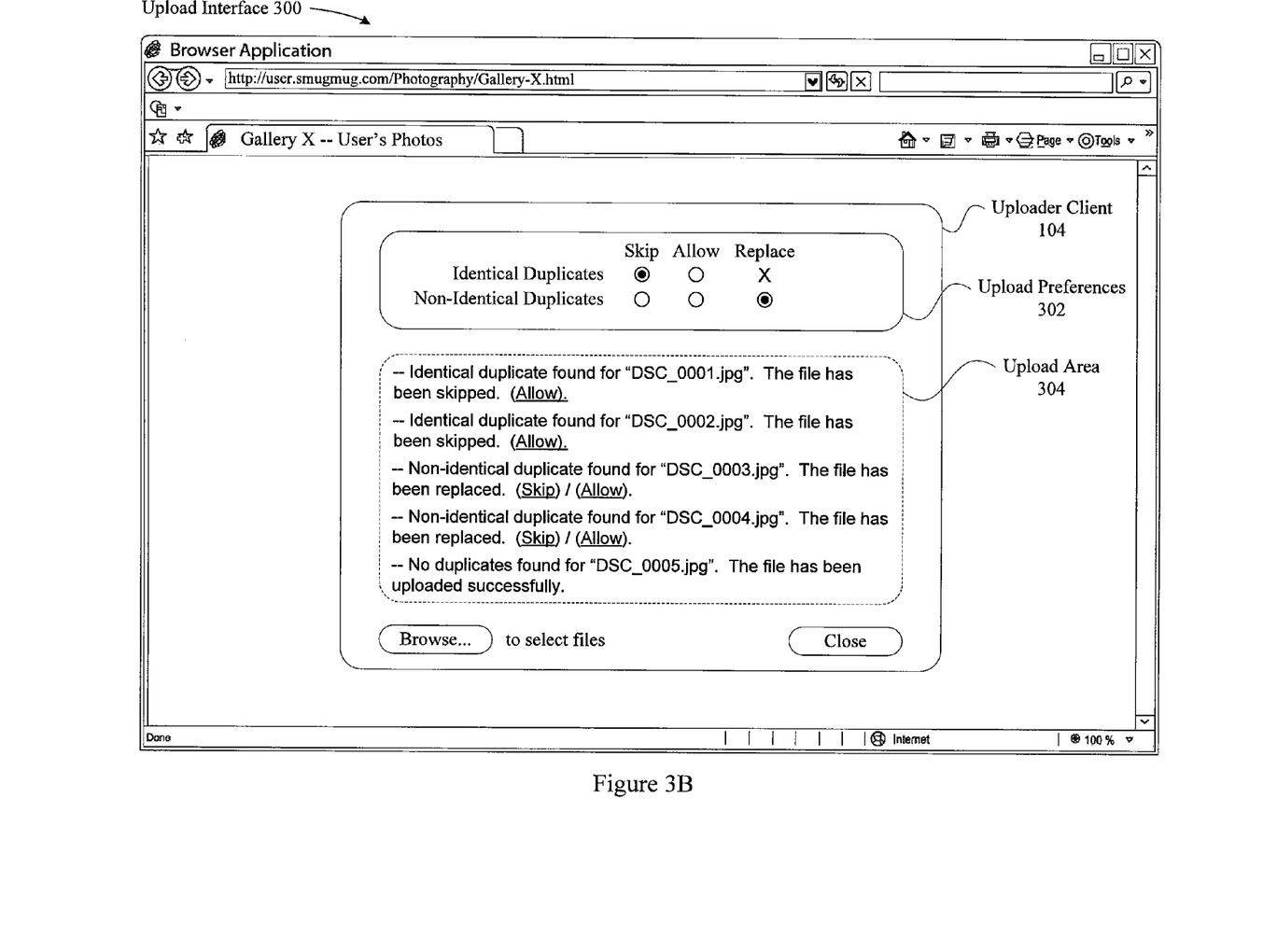
FIG. 3B is a screenshot of upload interface configured to view and override duplicate file upload conflicts, according to one embodiment of the invention.

FIG. 3B is a screenshot of upload interface 300 configured to view and override duplicate file upload conflicts, according to one embodiment of the invention. As shown, a user has attempted to upload five digital media files with filenames "DSC_001.jpg", "DSC_002.jpg", "DSC_003.jpg", "DSC_004.jpg" and "DSC_005.jpg". Here, digital media files with filenames "DSC_001.jpg" and "DSC_002.jpg" are identified as identical duplicates and are skipped, as specified by the user's upload preferences. Digital media files with filenames "DSC_003.jpg" and "DSC_004.jpg" are identified as non-identical duplicates and are replaced, as specified by the user's upload preferences. No duplicate is found for digital media files with filename "DSC_005.jpg", and the digital media file is uploaded.

As shown, each notification provides to the user the ability to override the way in which the duplicate identification is handled, e.g., the user may choose to allow the identical duplicate "DSC_001.jpg" to be uploaded. A more detailed explanation of identical duplicates and non-identical duplicates and the way in which they are uploaded is provided below in conjunction with FIGS. 4-5.

Persons having ordinary skill in the art will understand that the screenshots shown in FIGS. 3A-3B are merely exemplary and that other configurations are also within the scope of embodiments of the invention. Persons having ordinary skill in the art will further understand that uploader client 104 is not limited to execution within a web browser application, and may instead be a client application executable on the device with which the user is accessing his or her account 114, e.g., a client application executing on a mobile device.

Figure 4:
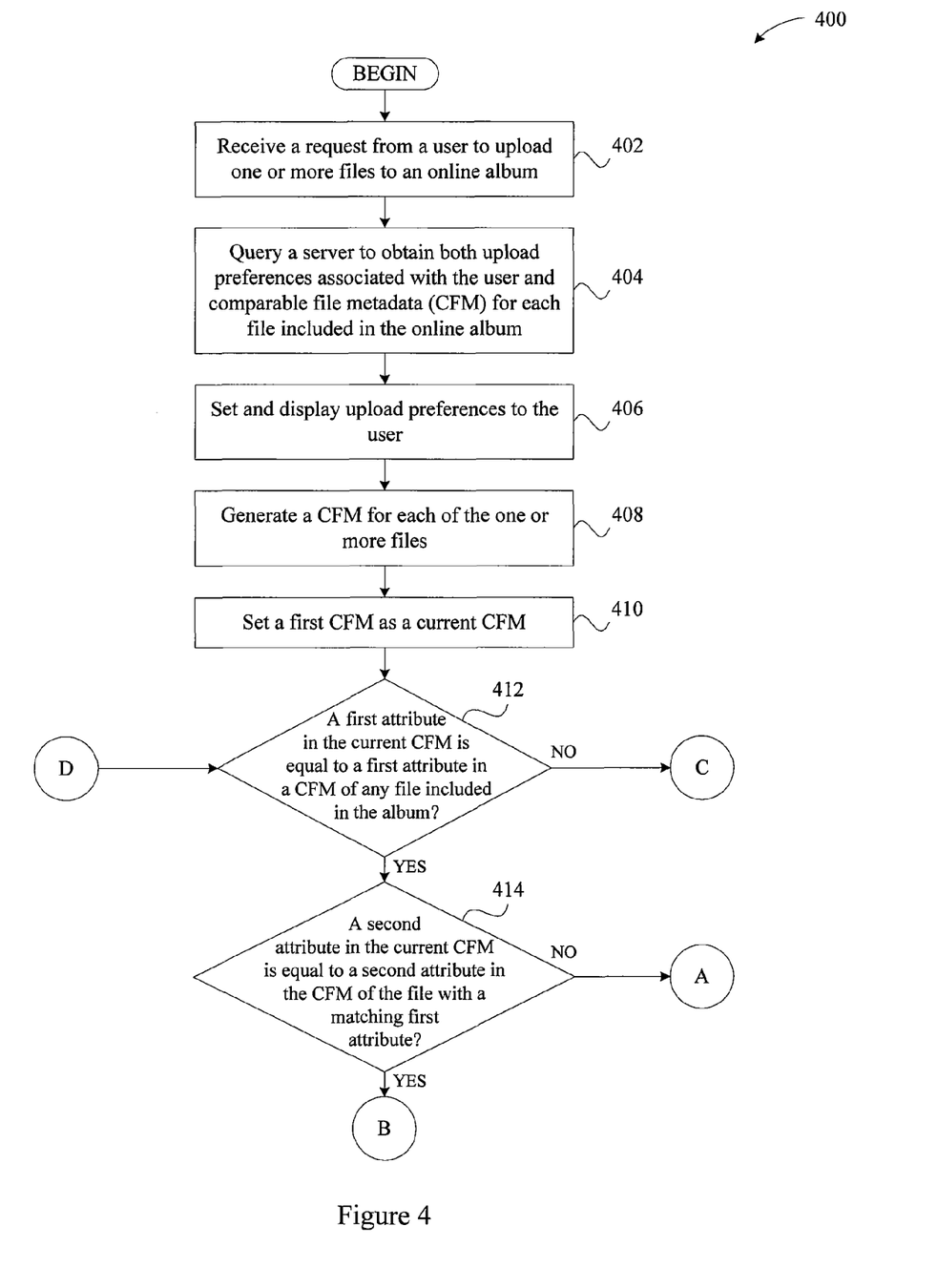
FIG. 4 is a flow diagram of method steps for managing duplicate file uploads by operation of an uploader client, according to one embodiment of the invention.

FIG. 4 is a flow diagram of method steps for managing duplicate file uploads by operation of uploader client 104, according to one embodiment of the invention. Persons skilled in the art will understand that, even though method 400 is described in conjunction with FIGS. 1-3B, any system configured to perform the method steps, in any order, is within the scope of embodiments of the invention. As shown, method 400 begins at step 402, where uploader client 104 receives a request from a user to upload one or more digital media files to an online album 116. As described above, this request may be generated when a user creates a new online album 116, or selects an existing online album 116 to which he or she desires to upload digital media files.

At step 404, uploader client 104 queries web servers 108 to obtain both upload preferences associated with the user and comparable file metadata (CFM) for each digital media file included in the online album 116.

CFMs are generated according to variety of techniques. In one example, web servers 108 generate a CFM for a digital media file using the filename of the digital media file, one or more attributes of the digital media file (e.g., byte count, resolution, color depth, date created, compression, video length, etc.), one or more attributes included in Exchangeable image file format (Exif) metadata that is typically calculated and included in the digital media file (when the digital media file is created on, e.g., a digital camera), and the like. The CFM for the digital media file may include any of the foregoing parameters and may also include combinations of the parameters, e.g., adding, subtracting, multiplying, dividing, etc., values of the parameters. Moreover, the CFM for the digital media file may also include a resulting value of a hash function performed on the digital media file, such as an MD5 hash. In this way, only a small portion of data relative to the total size of the digital media file is transferred between web servers 108 and uploader client 104, which provides bandwidth and latency efficiency.

Web servers 108 receive the query from uploader client 104 and reference database 112 to locate an account 114 that is associated with the user and includes the user's upload preferences. Web servers 108 also reference database 112 to retrieve from the online album 116 CFMs that have already been generated for one or more the digital media files included in the online album 116. If the online album 116 includes digital media files that do not have an associated CFM, then web servers 108 generate a CFM for those digital media files so that the query generated by uploader client 104 in step 404 is fully satisfied.

At step 406, uploader client 104 sets and displays the user's upload preferences to the user, as described above in conjunction with FIGS. 3A-3B. The user is able to adjust his or her upload preferences, where any changes are automatically transmitted by uploader client 104 to web servers 108 and updated in the account 114 associated with the user.

At step 408, uploader client 104 generates a CFM for each of the one or more digital media files according to the techniques described above. At step 410, uploader client 104 sets a first CFM of a first digital media file being uploaded as a current CFM, where the current CFM is compared against each of the CFMs for digital media files already included in the online album 116, as described below.

More specifically, at step 412, uploader client 104 determines whether a first attribute in the current CFM is equal to a first attribute in a CFM of any file included in the online album 116. In one example, the first attribute in the current CFM is the filename of the digital media file associated with the current CFM, e.g., "DSC1023.jpg". Thus, uploader client 104 parses each of the filename attributes in the CFMs for the digital media files included in the online album 116 to find a match. If uploader client 104 is unable to identify a match across the first attribute, then the digital media file associated with the current CFM is considered to be unique to the online album 116, and at step 424, uploader client 104 uploads to web servers 108 both the current CFM and the digital media file associated with the current CFM such that the digital media file is added to the online album 116 as a new digital media file. Uploading the current CFM advantageously eliminates the need to regenerate a CFM for the digital media file when the user subsequently uploads one or more additional digital media files to the online album 116.

If, however, at step 412, uploader client 104 identifies a match between the first attribute of the current CFM and the first attribute of a CFM associated with a digital media file included in the online album 116, then a more detailed comparison is required to determine whether the digital media files are "identical duplicates" or "non-identical duplicates."

Accordingly, to determine whether the digital media file associated with the current CFM is an identical duplicate or a non-identical duplicate of the digital media file with a first attribute that matches the current CFM, at step 414 uploader client 104 determines whether a second attribute in the current CFM is equal to a second attribute in the CFM of the digital media file with the first attribute that matches the first attribute in the current CFM. If uploader client 104 determines a match between the second attribute in the foregoing CFMs, then the digital media files associated with these CFMs are identified as identical duplicates of one another. In some cases, it would be redundant to replace a file with an identical duplicate of the file, and the option to replace identical duplicates is disabled (as illustrated in FIGS. 3A-3B). Nevertheless, replacement of an identical duplicate remains within the scope of embodiments of the invention.

Though the techniques described herein generally employ the comparison of a first attribute and a second attribute included in CFMs, uploader client 104 and/or web servers 108 may be configured to compare any N number of attributes included in CFMs. In one embodiment, at step 412, uploader client 104 is configured to determine whether a first set of one or more attributes (for example, a first, second and third attribute) in the current CFM are equal to corresponding first set of one or more attributes in a CFM of any file included in the online album 116. Further, at step 414, uploader client 104 is configured to determine whether a second set of one or more attributes (for example, a fourth and fifth attribute) in the current CFM are equal to a corresponding second set of one or more attributes in the CFM of the digital media file that matches the first set of one or more attributes in the current CFM.

If, at step 414, uploader client 104 determines that a second attribute in the current CFM is equal to a second attribute in the CFM of the digital media file with the first attribute that matches the first attribute in the current CFM, then the digital media file associated with these CFMs are considered to be identical duplicates of one another, and method 400 proceeds to step 422.

At step 422, uploader client 104 determines whether the user's upload preferences specify to skip the identical duplicate. If, at step 422, uploader client 104 determines that the user's upload preferences specify to skip identical duplicates, then the digital media file associated with the current CFM is disregarded, and method 400 proceeds to step 428, where uploader client 104 determines whether additional files are present that remain to be analyzed. If additional files are present, uploader client 104, at step 430, sets a CFM of the next file as the current CFM, and one or more of steps 412-430 are repeated. Otherwise, method 400 ends.

If, at step 422, uploader client 104 determines that the user's upload preferences specify not to skip identical duplicates, then the identical duplicate is allowable, and at step 424 uploader client 104 uploads to web servers 108 the digital media file associated with the current CFM such that the digital media file is added as a new file to the online album 116. Because the digital media file associated with the current CFM has a filename that conflicts with a digital media file included in the online album 116, uploader client 104 renames the digital media file when the digital media file is uploaded. For example, if the digital media file associated with the current CFM has a filename "image_022.jpg", uploader client 104, in some embodiments, renames the digital media file in the online album 116 as "image_022_1.jpg" to eliminate the filename conflict.

Referring back now to step 414, if uploader client 104 determines that a second attribute in the current CFM is not equal to a second attribute in the CFM of the digital media file with the first attribute that matches the first attribute in the current CFM, then the digital media file associated with these CFMs are non-identical duplicates of one another. Accordingly, method 400 proceeds to step 420, where uploader client 104 determines whether the user's upload preferences specify to replace non-identical duplicates. If, at step 420, uploader client 104 determines that the user's upload preferences specify not to replace non-identical duplicates, then method 400 proceeds to step 422, as described above, where the file is either skipped or uploaded. If, at step 420, uploader client 104 determines that the user's upload preferences specify to replace non-identical duplicates, method 400 proceeds to step 426, where uploader client 104 uploads to web servers 108 both the current CFM and the digital media file associated with the current CFM such that the digital media file replaces the non-identical duplicate digital media file.

As described above, method steps 412-430 are repeated by uploader client 104 until each of the one or more digital media files selected for upload are uploaded according to the user's upload preferences.

Figure 5:
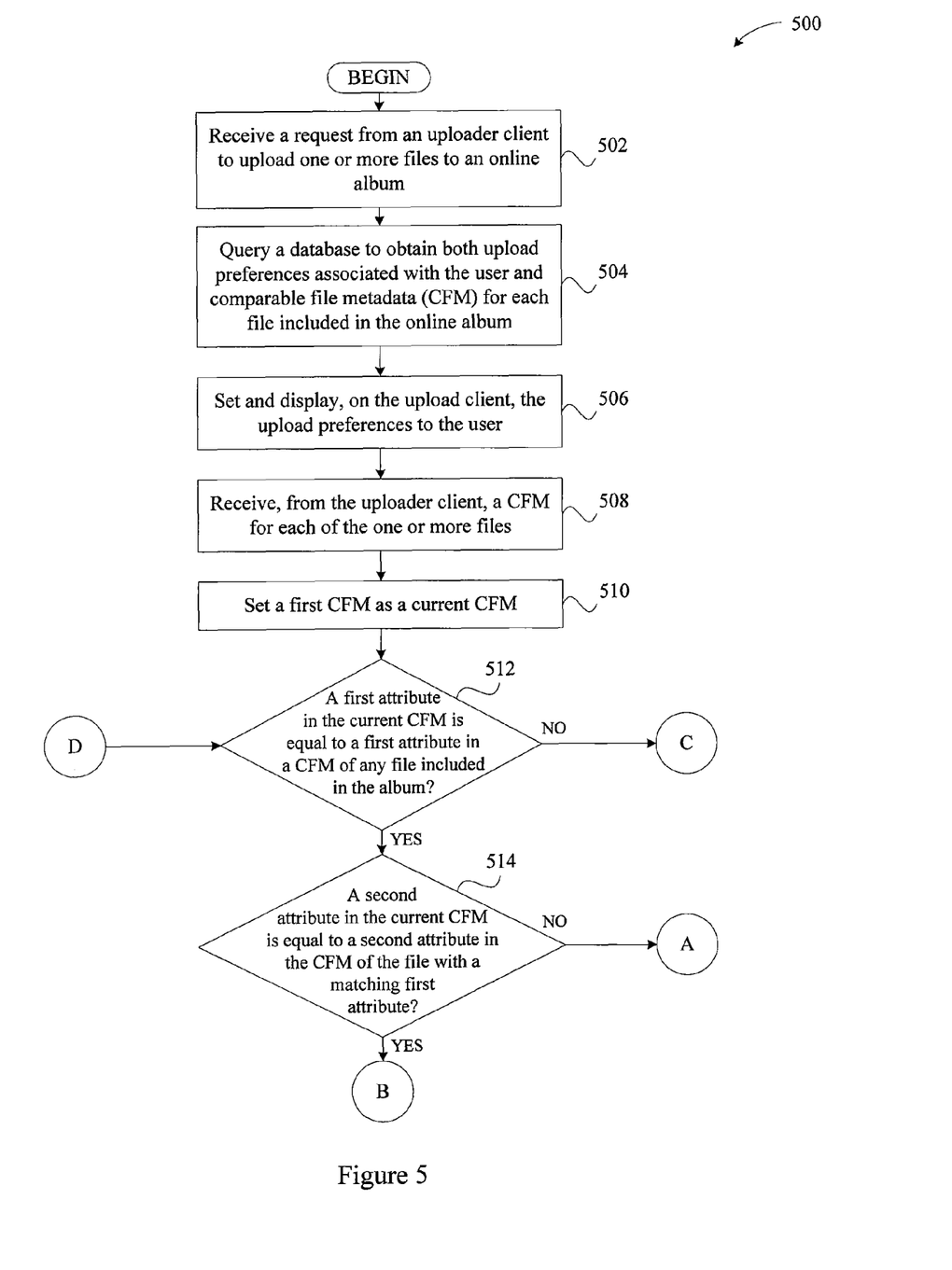
FIG. 5 is a flow diagram of method steps for managing duplicate file uploads by operation of a web server, according to one embodiment of the invention.

FIG. 5 is a flow diagram of method steps for managing duplicate file uploads by operation of a web server 108, according to one embodiment of the invention. Persons skilled in the art will understand that, even though method 500 is described in conjunction with FIGS. 1-3B, any system configured to perform the method steps, in any order, is within the scope of embodiments of the invention. As shown, method 500 begins at step 502, where a web server 108 receives a request from uploader client 104 loaded by a user to upload one or more digital media files to an online album 116.

At step 504, web server 108 queries database 112 to obtain both upload preferences associated with the user and comparable file metadata (CFM) for each digital media file included in the online album 116. At step 506, web server 108 sets and displays the user's upload preferences to the user in uploader client 104, as described above in conjunction with FIGS. 3A-3B.

At step 508, web server 108 receives from uploader client 104 a CFM for each of the one or more digital media files that the user is intending to upload. At step 510, web server 108 sets a first CFM of a first digital media file being uploaded as a current CFM, where the current CFM is compared against each of the CFMs for digital media files already included in the online album 116, as described below.

At step 512, web server 108 determines whether a first attribute in the current CFM is equal to a first attribute in a CFM of any file included in the online album 116. If web server 108 is unable to identify a match across the first attribute, then the digital media file associated with the current CFM is considered to be unique to the online album 116, and at step 524, web server 108 receives from uploader client 104 both the current CFM and the digital media file associated with the current CFM and adds the digital media file to the online album 116 as a new digital media file.

If, however, at step 512, web server 108 identifies a match between the first attribute of the current CFM and the first attribute of a CFM associated with a digital media file included in the online album 116, then at step 514 web server 108 determines whether a second attribute in the current CFM is equal to a second attribute in the CFM of the digital media file with the first attribute that matches the first attribute in the current CFM. If web server 108 determines a match between the second attribute in the foregoing CFMs, then the digital media files associated with these CFMs are identified, or considered as, as identical duplicates of one another.

If, at step 514, web server 108 determines that a second attribute in the current CFM is equal to a second attribute in the CFM of the digital media file with the first attribute that matches the first attribute in the current CFM, then the digital media file associated with these CFMs are identical duplicates of one another, and method 500 proceeds to step 522.

At step 522 web server 108 determines whether the user's upload preferences specify to skip the identical duplicate. If, at step 522, web server 108 determines that the user's upload preferences specify to skip identical duplicates, then the digital media file associated with the current CFM is disregarded, and method 500 proceeds to step 528, where web server 108 determines whether additional files are present that remain to be analyzed. If additional files are present, web server 108, at step 530, sets a CFM of the next file as the current CFM, and one or more of steps 512-430 are repeated. Otherwise, method 500 ends.

If, however, at step 522, web server 108 determines that the user's upload preferences specify not to skip identical duplicates, then the identical duplicate is allowable, and at step 524 web server 108 receives from upload client 104 the digital media file associated with the current CFM and adds the digital media file as a new file to the online album 116.

Referring back now to step 514, if web server 108 determines that a second attribute in the current CFM is not equal to a second attribute in the CFM of the digital media file with the first attribute that matches the first attribute in the current CFM, then the digital media file associated with these CFMs are non-identical duplicates of one another. Accordingly, method 500 proceeds to step 520, where web server 108 determines whether the user's upload preferences specify to replace non-identical duplicates. If, at step 520, web server 108 determines that the user's upload preferences specify not to replace non-identical duplicates, then method 500 proceeds to step 522, as described above, where the file is either skipped or uploaded. If, at step 520, uploader client 104 determines that the user's upload preferences specify to replace non-identical duplicates, method 500 proceeds to step 526, where web server 108 receives from upload client 104 both the current CFM and the digital media file associated with the current CFM and replaces the non-identical duplicate digital media file.

As described above, method steps 512-430 are repeated until each of the one or more digital media files selected for upload are uploaded according to the user's upload preferences.

Advantageously, embodiments of the invention provide an improved technique for managing uploads of duplicate digital media files. Digital media files being uploaded by a user to an online album are identified as non-duplicates, identical duplicates, or non-identical duplicates of digital media files included in the online album, where such duplicates are automatically skipped, allowed, or replaced, based on upload preferences associated with the user. As a result, handling of duplicate digital media files is automated and eliminates the need for a response from the user each time a duplicate is identified. Moreover, fragmentation of the online album normally caused by duplicate files is reduced.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A method for managing uploads of identical duplicate files, the method sequentially comprising:
   receiving user preferences regarding what to do when a request is received to upload a first file that is determined to be an identical duplicate of a second file already present in an online album, wherein the first file and the second file are determined to have identical content;
   uploading the first file from a user that is an identical duplicate of the second file;
   analyzing the user preferences based on one or more shared attributes between the first file and the second file, wherein the one or more attributes of the first file and the second file include at least a filename, byte count, exchangeable image file format (Exif) metadata, and a resulting value of a hash function; and
   based upon the user preferences,
      replicating only identical duplicates of the second file; and
      causing the first file to be provided as a new file to the online album with a filename different than a the second filename of the second file.

2. The method of claim 1, wherein determining whether the first file is an identical duplicate of the second file comprises comparing a first attribute of the first file and a first attribute of the second file and a second attribute of the first file and a second attribute of the second file.

3. The method of claim 2, wherein the first attribute is the filename and the second attribute is the Exif metadata.

4. The method of claim 2, wherein a match is identified across the first attribute and a non-match is identified across the second attribute.

5. The method of claim 2, wherein a match is identified across the first attribute and a match is identified across the second attribute.

6. A non-transitory computer-readable storage medium storing instructions that when executed by a processor cause the processor to manage uploads of identical duplicate files, the method sequentially comprising:
   receiving user preferences regarding what to do when a request is received to upload a first file that is determined to be an identical duplicate of a second file already present in an online album, wherein the first file and the second file are determined to have identical content;
   uploading the first file from a user that is an identical duplicate of the second file;
   analyzing the user preferences based on one or more shared attributes between the first file and the second file, wherein the one or more attributes of the first file and the second file include at least a filename, byte count, exchangeable image file format (Exif) metadata, and a resulting value of a hash function; and based upon the user preferences, replicating only identical duplicates of the second file; and causing the first file to be provided as a new file to the online album with a filename different than a filename of the second file.

7. The non-transitory computer-readable storage medium of claim 6, wherein determining whether the first file is an identical duplicate of the second file comprises comparing a first attribute of the first file and a first attribute of the second file and a second attribute of the first file and a second attribute of the second file.

8. The non-transitory computer-readable storage medium of claim 7, wherein the first attribute is the filename and the second attribute is the Exif metadata.

9. The non-transitory computer-readable storage medium of claim 7, wherein a match is identified across the first attribute of the first file and the first attribute of the second file and a non-match is identified across the second attribute of the first file and the second attribute of the second file.

10. The non-transitory computer-readable storage medium of claim 7, wherein a match is identified across the first attribute of the first file and the first attribute of the second file and a match is identified across the second attribute of the first file and the second attribute of the second file.

11. A method for managing uploads of files, the method comprising:

receiving user preferences regarding what to do when a request is received to upload a first file that is determined to be an identical duplicate of a second file already present in an online album, wherein the first file and the second file are determined to have identical content;

uploading the first file from an uploader client that is an identical duplicate of the second file;

analyzing the user preferences regarding what to do when a request is received to upload the first file that is determined to be an identical duplicate of the second file already present in the online album, wherein determining whether the first file is an identical duplicate of the second file comprises comparing a first attribute of the first file and a first attribute of the second file and/or comparing results of an operation performed on the first file and the second file, and wherein the one or more attributes of the first file and the second file include at least a filename, byte count, exchangeable image file format (Exif) metadata, and a resulting value of a hash function; and based upon the user preferences, replicating only identical duplicates of the second file; and causing the first file to be provided as a new file to the online album with a filename different than a filename of the second file.

12. The method of claim 11, wherein a match is identified across the first attribute of the first file and the first attribute of the second file and a non-match is identified across the results of the operation.

13. The method of claim 11, wherein determining whether the first file is an identical duplicate of the second file comprises comparing a first attribute of the first file and a first attribute of the second file and a second attribute of the first file and a second attribute of the second file.

14. A non-transitory computer-readable storage medium storing instructions that when executed by a processor cause the processor to manage uploads of identical duplicate files, the method sequentially comprising:

receiving user preferences regarding what to do when a request is received to upload a first file that is determined to be an identical duplicate of a second file already present in an online album, wherein the first file and the second file are determined to have identical content;

uploading the first file from an uploader client that is an identical duplicate of the second file;

analyzing the user preferences regarding what to do when a request is received to upload the first file that is determined to be an identical duplicate of the second file already present in the online album, wherein determining whether the first file is an identical duplicate of the second file comprises comparing a first attribute of the first file and a first attribute of the second file and/or comparing results of an operation performed on the first file and the second file, and wherein the one or more attributes of the first file and the second file include at least a filename, byte count, exchangeable image file format (Exif) metadata, and a resulting value of a hash function; and based upon the user preferences, replicating only identical duplicates of the second file; and causing the first file to be provided as a new file to the online album with a filename different than a filename of the second file.

15. The non-transitory computer-readable storage medium of claim 14, wherein a match is identified across the first attribute of the first file and the first attribute of the second file and a non-match is identified across the results of the operation.

16. The non-transitory computer-readable storage medium of claim 14, wherein determining whether the first file is an identical duplicate of the second file comprises comparing a first attribute of the first file and a first attribute of the second file and a second attribute of the first file and a second attribute of the second file.

* * * * *